G. L. Howland,
Lifting Jack,
No 58,103.
Patented Sept. 18, 1866.

Witnesses.

Inventor.

UNITED STATES PATENT OFFICE.

GEORGE L. HOWLAND, OF TOPSHAM, MAINE.

IMPROVEMENT IN HOISTING APPARATUS.

Specification forming part of Letters Patent No. 58,103, dated September 18, 1866.

*To all whom it may concern:*

Be it known that I, GEORGE L. HOWLAND, of Topsham, Sagadahoc county, State of Maine, have invented a new and useful Improvement in Hoisting Apparatus; and I do hereby declare that the following is a full, clear, and exact description thereof, which will enable others skilled in the art to make and use the same, reference being had to the accompanying drawings, forming part of this specification, in which—

Figure 1:
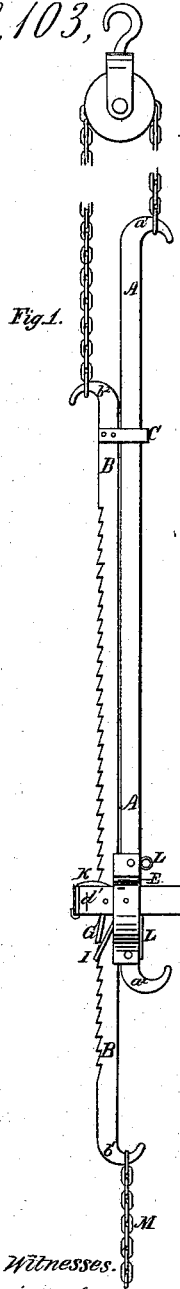
Figure 2:
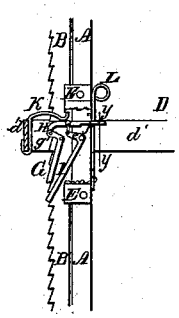
Figure 3:
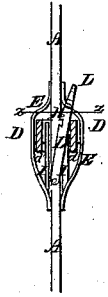
Figure 4:
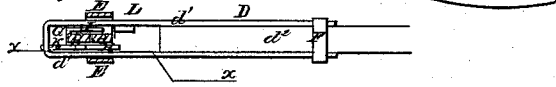

Figure 1 is a side view of my improved hoisting apparatus. Fig. 2 is a detail sectional view of the same, taken through the line $x\ x$, Fig. 4. Fig. 3 is a detail sectional view of the same, taken through the line $y\ y$, Fig. 2. Fig. 4 is a detail sectional view of the same, taken through the line $z\ z$, Fig. 3.

Similar letters of reference indicate like parts.

My invention has for its object to furnish an improved hoisting apparatus by means of which weights may be raised or lowered to or from any desired elevation, which will occupy but little space, and be easily transferable from one place to another; and it consists of an improved hoisting apparatus formed by combining the bars, lever, pawls, and springs with each other, the whole being constructed and arranged as hereinafter described.

A is the hanging bar, upon the upper end of which is formed a hook, $a'$, by means of which the apparatus may be hung from any suitable fixed support while being used. B is the notched or sliding bar, which slides up and down along the front edge of the bar A, as shown in Fig. 1.

C is a clasp or keeper, the ends of which are attached to the upper end of the bar B, and which passes around the body of the bar A, as shown, so as to keep the two bars in their proper relative positions when being used. The front edge of the bar B is notched, the notches being one inch long and one-half an inch deep. The notched bar B is four feet four inches long, one and a half inches wide, and one-half an inch thick. The bar A is four feet long, one inch wide, and one-half an inch thick.

To the lower end of the bar A is pivoted the lever D, which is six feet long from the fulcrum to the end or handle. This lever D is made in two parts, $d'\ d^2$. The part $d'$ is a metallic band passing around the bars A B, and pivoted to the lower end of the bar A and to the guide-braces E, as shown in the drawings. Between the projecting ends of this band $d'$ is pivoted the end of the part $d^2$, and the two parts are kept in place while being used by the band F. By removing this band the part $d^2$ of the lever may be turned up parallel to the bars A and B, for convenience in carrying the apparatus from place to place.

G is the lifting-pawl, which is made nearly in the form of the letter U, and is three and a quarter inches long. The ends of this pawl are pivoted to the part $d$ of the lever D at a point one and a half inches from the fulcrum of said lever. To an arm, $g'$, projecting forward from the upper end of one arm of the pawl G, is pivoted the end of the lever H, the rear end of which terminates in a spring projecting at the rear edge of the bar A, as shown in Fig. 2.

I is the holding-pawl, which sustains the weight while the pawl G is being lowered to the next notch. This pawl I is five inches long, is made nearly in the form of the letter U, and is pivoted to the lever D by the same bolt by which the said lever D is pivoted to the bar A.

$i$ is an arm projecting forward from the upper end of one arm of the pawl I, and which is pivoted to the lever H by the connecting bars or link J.

K is a spring, one end of which is attached to the forward part $d'$ of the lever D, as shown in Fig. 2, and its other end rests upon the upper side of the forward end of the lever H, forcing the pawl G back against the notches of the bar B.

L is a stop, the lower end of which is pivoted to the edge of the bar A, as shown in Fig. 3. In one edge of this stop, near its upper end, is formed a notch, into which the rear end of the lever H enters, and by which the movement of the said lever is restricted. When the stop L is moved into the position represented in Fig. 3, the said lever H is left free to act.

E are braces attached to the sides of the bar A, to strengthen the apparatus at the point where the various parts are connected together, and which, at the same time, serve as guides to the bar B, keeping it in proper position to be acted upon by the pawls G and I.

In using the apparatus the hook $a'$, formed upon the upper end of the bar A, is hooked into some fixed support, and the bar B lowered. The chain M, attached to the weight, is then hooked upon the hook $b'$, formed upon the lower end of the bar B. Then, by depressing the free end of the lever D, the weight is raised until the pawl I drops into the next lower notch, which supports the weight while the end of the lever D is being raised. This causes the pawl G to descend one notch, and it is then forced into place by the combined action of its own weight, of the spring K, and of the lever H. By continuing this operation the bar B, and with it the weight, is raised the whole length of the notched part of the bar B. A link of the chain is then passed over the hook $a^2$, formed upon the lower end of the bar A, which supports the weight while the bar B is being lowered, and again attached to the chain that supports the weight. The bar B, when no weight is attached to it, is lowered by raising the pawls G and I with one hand, while the said bar is lowered with the other hand.

When it is desired to lower the bar B with a weight attached to it, or, in other words, to lower a weight by means of this apparatus, the stop L is placed in the position represented in Fig. 2. This restricts the operation of the lever H, so that, as the lever D is worked, the pawls fall a little short of reaching the next lower notch. The result is that the bar B, instead of being raised, is lowered.

In raising very heavy weights the hook $a'$, instead of being attached to a stationary support, may be attached to the end of a chain, M, which passes over a fixed pulley, N, and the other end of which is attached to the hook $b^2$, formed upon the upper end of the bar B. This distributes the weight and enables it to be raised with less outlay of power.

I claim as new and desire to secure by Letters Patent—

An improved hoisting apparatus formed by combining with each other the bars A B, the levers D H, the pawls G I, the spring K, and the stop L, the parts being constructed and arranged substantially as described, and for the purpose set forth.

GEORGE L. HOWLAND.

Witnesses:
GEORGE H. GOUD,
DAVID P. DUDLEY.